(12) United States Patent
Prociw et al.

(10) Patent No.: US 8,074,452 B2
(45) Date of Patent: *Dec. 13, 2011

(54) NESTED CHANNEL DUCTS FOR NOZZLE CONSTRUCTION AND THE LIKE

(75) Inventors: Lev Alexander Prociw, Elmira (CA); Harris Shafique, Longueuil (CA); John Sokalski, Greenfield Park (CA); Claude Raymond Pelletier, Varennes (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1050 days.

This patent is subject to a terminal disclaimer.

(21) Appl. No.: 12/124,593

(22) Filed: May 21, 2008

(65) Prior Publication Data

US 2009/0320479 A1    Dec. 31, 2009

Related U.S. Application Data

(60) Division of application No. 11/338,827, filed on Jan. 25, 2006, now abandoned, which is a continuation of application No. 10/231,334, filed on Aug. 30, 2002, now Pat. No. 7,028,484.

(51) Int. Cl.
*F02C 7/22* (2006.01)
*F23R 3/00* (2006.01)
(52) U.S. Cl. .......................................... 60/739; 60/740
(58) Field of Classification Search .................. 60/739, 60/742, 740
See application file for complete search history.

(56) References Cited

U.S. PATENT DOCUMENTS

| | | | |
|---|---|---|---|
| 1,321,976 A | 11/1919 | Brown |
| 1,622,664 A | 3/1927 | Murray et al. |
| 2,151,540 A | 3/1939 | Varga |
| 2,591,880 A | 4/1952 | Sammons |
| 2,946,185 A | 7/1960 | Bayer |
| 3,213,523 A | 10/1965 | Boehler |
| 3,472,025 A | 10/1969 | Simmons et al. |
| 3,625,258 A | 12/1971 | Phelps |
| 4,100,733 A | 7/1978 | Streibel et al. |
| 4,322,945 A | 4/1982 | Peterson et al. |
| 4,404,806 A | 9/1983 | Bell, III et al. |
| 5,036,657 A | 8/1991 | Seto et al. |
| 5,253,471 A | 10/1993 | Richardson |
| 5,271,219 A | 12/1993 | Richardson |
| 5,396,759 A | 3/1995 | Richardson |
| 5,400,968 A | 3/1995 | Sood |
| 5,419,115 A | 5/1995 | Butler et al. |
| 5,423,178 A | 6/1995 | Mains |
| 5,570,580 A | 11/1996 | Mains |
| 5,579,645 A | 12/1996 | Prociw et al. |
| 5,598,696 A | 2/1997 | Stotts |
| 5,765,360 A | 6/1998 | Schmidt et al. |

(Continued)

FOREIGN PATENT DOCUMENTS

CA    1013153    7/1977

(Continued)

*Primary Examiner* — Ted Kim
(74) *Attorney, Agent, or Firm* — Norton Rose OR LLP

(57) ABSTRACT

A multiple conduit system for a gas turbine engine, the multiple conduit system extending between a plurality of conduit inlet and outlets. A channel, adapted for conveying fuel flow, is formed in a surface of a gas turbine engine component. The channel includes at least a first discrete conduit and a second discrete conduit. The first and second discrete conduits are each adapted to direct an independent fluid flow from respective inlets to respective outlets.

17 Claims, 4 Drawing Sheets

U.S. PATENT DOCUMENTS

| | | |
|---|---|---|
| 5,771,696 A | 6/1998 | Hansel et al. |
| 5,848,525 A | 12/1998 | Spencer |
| 5,956,955 A | 9/1999 | Schmid |
| 5,983,642 A | 11/1999 | Parker et al. |
| 5,996,335 A | 12/1999 | Ebel |
| 6,109,038 A | 8/2000 | Sharifi et al. |
| 6,141,968 A | 11/2000 | Gates et al. |
| 6,149,075 A | 11/2000 | Moertle et al. |
| 6,240,732 B1 | 6/2001 | Allan |
| 6,256,995 B1 | 7/2001 | Sampath et al. |
| 6,463,739 B1 | 10/2002 | Mueller et al. |
| 6,761,035 B1 | 7/2004 | Mueller |
| 7,028,484 B2 * | 4/2006 | Prociw et al. .................. 60/772 |
| 2003/0014979 A1 | 1/2003 | Summerfield et al. |

FOREIGN PATENT DOCUMENTS

| | | |
|---|---|---|
| CA | 2307186 | 5/1999 |

* cited by examiner

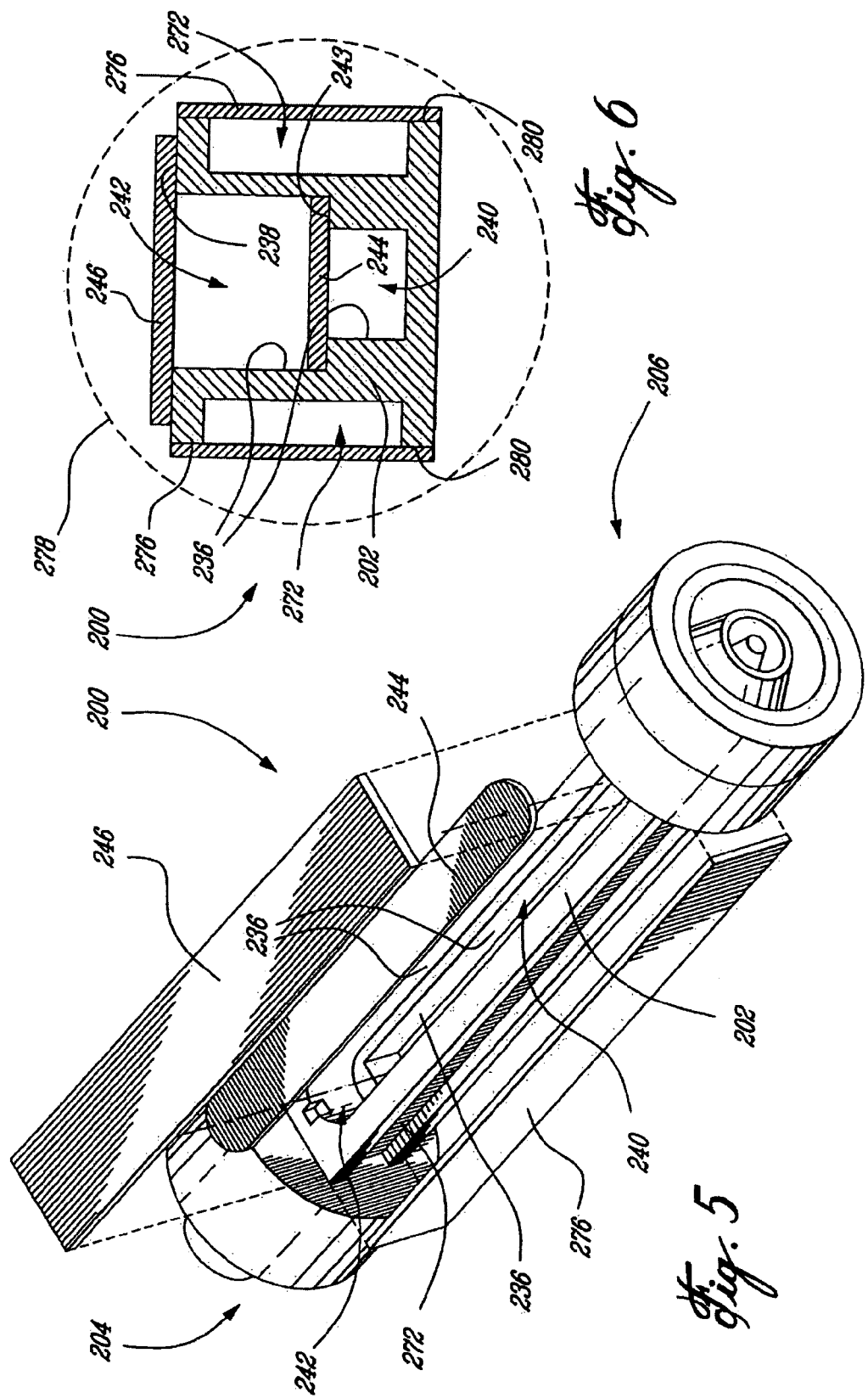

NESTED CHANNEL DUCTS FOR NOZZLE CONSTRUCTION AND THE LIKE

CROSS-REFERENCE TO RELATED APPLICATIONS

This application is a divisional of U.S. patent application Ser. No. 11/338,827 filed Jan. 25, 2006, now abandoned, which is a continuation of Ser. No. 10/231,334, filed 08/30/2002, now U.S. Pat. No. 7,028,484 which issued Apr. 18, 2006, the specifications of both which are incorporated herein by reference.

TECHNICAL FIELD

The present invention relates generally to gas turbine engines, and more particularly to a nested channel configuration for use in fuel manifolds, nozzle stems and the like.

BACKGROUND OF THE INVENTION

Fuel nozzles which supply fuel to a combustion chamber in a gas turbine engine are well known in the art. Generally, a plurality of circumferentially distributed fuel nozzles forming a nozzle array in the combustion chamber are used to ensure sufficient distribution of the fuel. The fuel nozzle array typically comprises a plurality of injector tip assemblies for atomizing fuel into the combustion chamber, the injector tips being connected to an outer fuel manifold via nozzle stems.

Some conventional nozzle systems define duel adjacent fuel passages, sometimes concentrically disposed within an outer tube. In an effort to provide a dual passage stem member which is relatively simpler and more economical to manufacture, it is also known to use a stem comprised of a solid piece of material having adjacent slotted fuel conduits. The distinct slots, formed side by side, define primary and secondary fuel conduits extending between the inlet and outlet of the nozzle stem, and are sealed by a brazed cover plate.

Prior art multiple channel systems are cumbersome, difficult to manufacture and maintain, and heavy. Accordingly, improvements are desirable.

SUMMARY OF THE INVENTION

It is an object of the present invention to provide an improved fuel injection system that is simpler and more economical to manufacture.

It is a further object of the present invention to provide a fuel injection system that, among other things, eliminates the need for multiple independent fuel manifolds and for complex fuel nozzle stems.

Therefore, in accordance with the present invention, there is provided a gas turbine engine fuel nozzle having a spray tip assembly in flow communication with a fuel source, the fuel nozzle comprising: a fuel-conveying member comprising a stepped channel formed in a surface of the fuel-conveying member for providing fuel flow to the spray tip assembly; at least a first inner sealing plate being disposed within the stepped channel and, dividing the stepped channel into at least a primary and a secondary discrete nested conduit; and an outer sealing plate being engaged with the surface for enclosing the stepped channel; whereby each discrete nested conduit is adapted for directing an independent fuel flow from the fuel source to the spray tip assembly.

There is also provided, in accordance with the present invention, a method of manufacturing a gas turbine engine fuel nozzle having multiple discrete fuel conduits for directing independent fuel flows from a fuel source to a spray tip assembly, the method comprising: providing a fuel-conveying member formed from a single solid piece of material; machining a single stepped channel in a surface of the fuel-conveying member, the stepped channel defining at least primary and secondary nested slots, the secondary slot defining a larger cross-sectional area than the primary slot and being immediately open to the surface; fixing at least a first inner sealing plate having a width greater than a width of the primary slot, within the secondary slot with the first inner sealing plate abutting a shoulder formed by the stepped channel, thereby dividing the stepped channel into a primary discrete nested fuel conduit and the nested secondary slot; and fixing an outer channel sealing plate to the fuel-conveying member to enclose the secondary slot thereby forming a secondary discrete nested fuel conduit.

BRIEF DESCRIPTION OF THE DRAWINGS

Further features and advantages of the present invention will become apparent from the following detailed description, taken in combination with the appended drawings, in which:

FIG. 5 is a perspective view of a second embodiment of a fuel injection system according to the present invention comprising a fuel nozzle stem having nested fuel channels formed therein.

FIG. 6 is a cross-sectional view of the nested channel fuel nozzle stem of FIG. 5.

DETAILED DESCRIPTION OF THE PREFERRED EMBODIMENT

Figure 1:
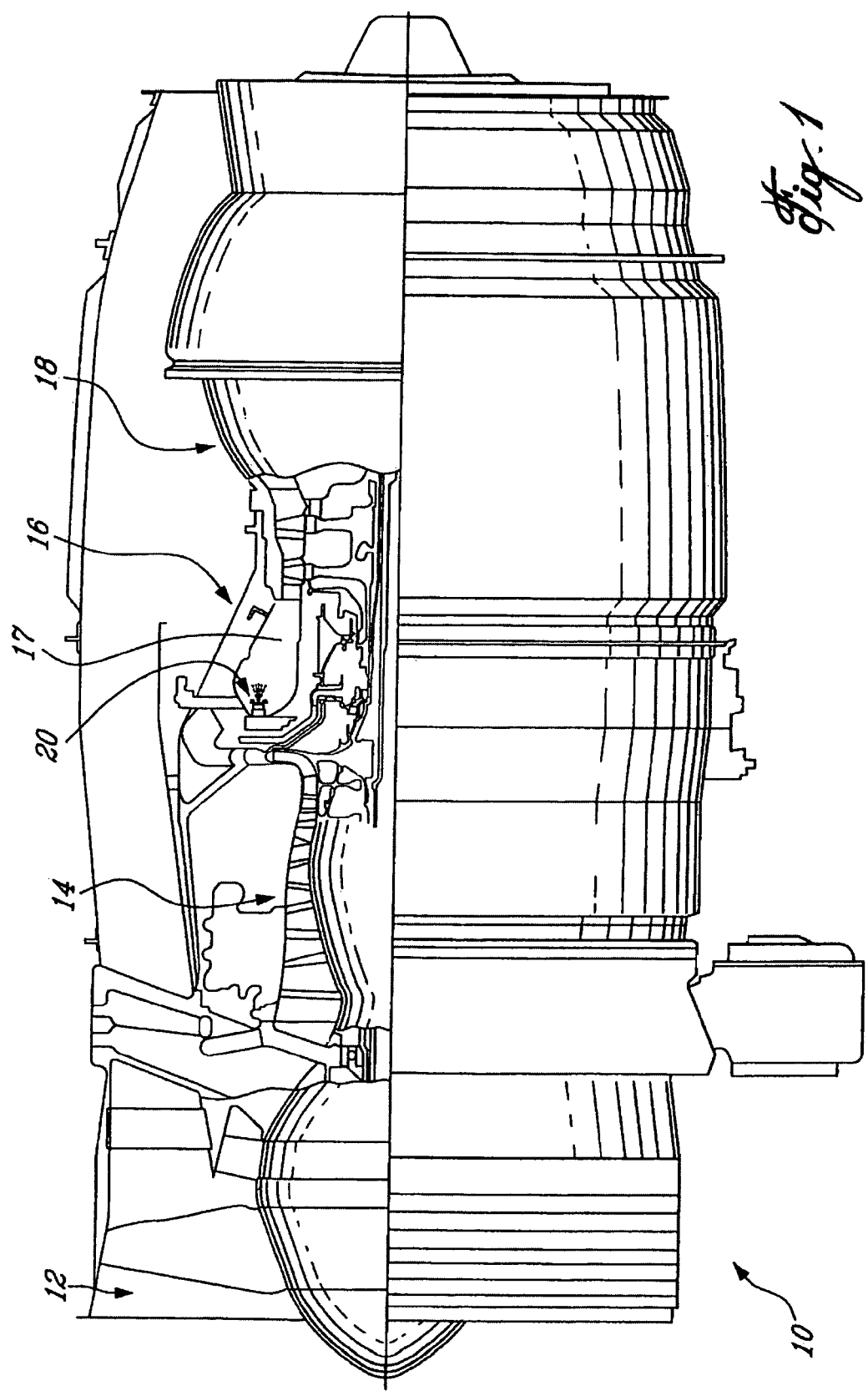
FIG. 1 is a cross-sectional view of a gas turbine engine comprising a fuel injection system according to the present invention.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized into a combustion chamber 17 by a fuel injection system comprising a fuel injection nozzle assembly 2Q, the mixture being subsequently ignited for generating hot combustion gases before passing through a turbine section 18 for extracting energy from the combustion gases.

Figure 2:
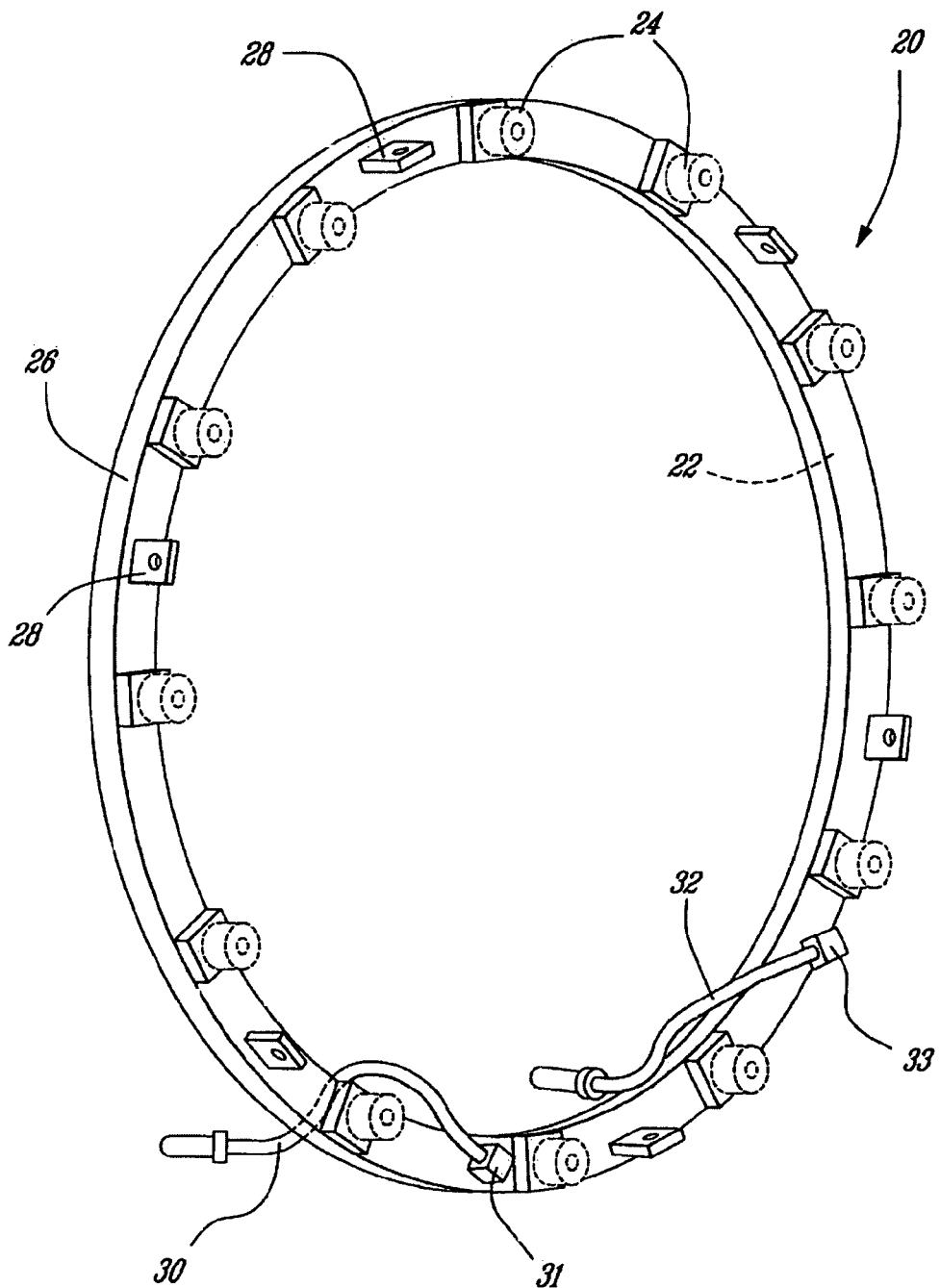
FIG. 2 is a perspective view of a first embodiment of a fuel injection system according to the present invention comprising an annular, nested channel fuel manifold ring.

Referring to FIG. 2, the fuel injection nozzle assembly 20 comprises an annular fuel manifold ring 22 generally disposed within the combustion chamber 17 of the engine, and mounted via several integral attachment lugs 28 for fixing the annular ring 22 to an appropriate support structure. The annular fuel manifold ring 22 comprises a plurality of fuel injector spray tip assemblies 24 thereon, which atomize the fuel for combustion. The exterior of the annular ring 22 comprises an outer heat shield 26 covering the ring. This provides the fuel manifold ring thermal protection from the high temperature environment of the combustion chamber. A primary fuel inlet pipe 30 and a secondary fuel inlet pipe 32 provide dual, independent fuel feeds to the manifold, which distributes the two fuel supplies to the spray tip assemblies. The spray tip assemblies 24 are directly mounted to the annular fuel manifold ring, without requiring conventionally used nozzle stems which are traditionally required to link, in fluid flow communication, the spray tip assemblies with each distinct fuel manifold for each fuel inlet source. The above features are generally known in the art.

Figure 3:
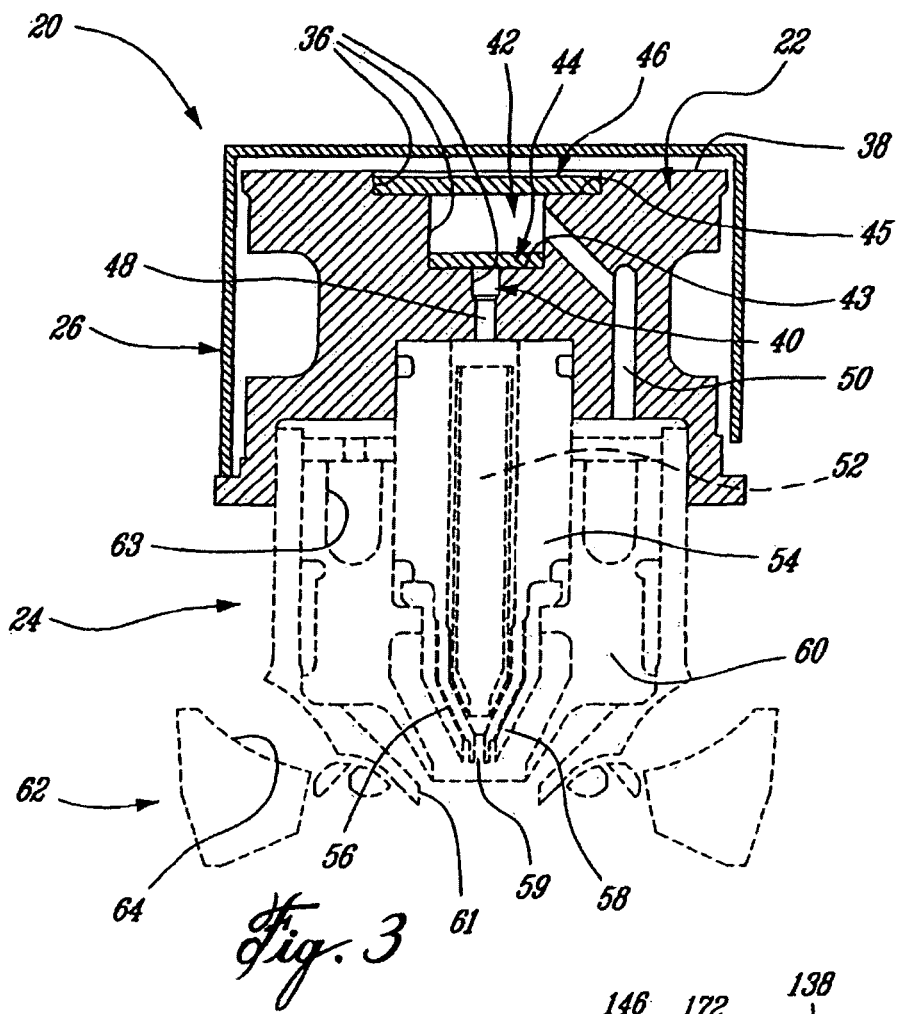
FIG. 3 is a cross-sectional view of the nested channel fuel manifold ring of FIG. 2.

Referring now to FIG. 3 more clearly showing the details of the fuel injection nozzle assembly 20 according to the present invention, the annular fuel manifold ring 22 is preferably formed from a single solid piece of material and comprises a single stepped channel 36 formed in an outer peripheral surface 38 of the manifold ring which is covered by a protective outer heat shield 26. The stepped channel 36 is preferably formed by a single machining operation, for example by a single milling or routing step using a multi-diametered bit of a predetermined size to create the number and size of the nested slots comprising the entire stepped channel 36. Once provided, as described below, the nested slots, defined by the stepped slot that is machined, or otherwise formed, in the fuel manifold ring, create annular fuel galleries which permit circumferential distribution of independently controllable fuel supplies to be fed to each spray tip assembly. The channel 36 has a length which is defined as the circumferential length or circumference of the channel.

The annular stepped channel 36 comprises at least two nested fuel conduits; namely a primary nested fuel conduit 40 and secondary nested fuel conduit 42. The annular primary fuel conduit is located in the manifold ring closest to the spray tip assemblies, and preferably (to facilitate manufacture) is much smaller in cross-sectional area than the annular secondary nested fuel conduit 42, which opens immediately to the peripheral surface 38 in which the stepped channel 36 is formed. A first inner sealing member or plate 44, sized such that it fits within the secondary conduit portion of the stepped channel and is larger than the width of the primary conduit (i.e. to seal it), is fixed against a first shoulder 43 formed in the stepped channel between the primary and secondary nested conduits, by way of brazing or, another fastening/sealing method. The first inner sealing plate 44 for the annular fuel manifold ring 22, is preferably also an annular ring plate, substantially extending around the full circumference of manifold ring. An outer stepped channel sealing member or plate 46 is similarly fixed to the fuel manifold ring 22 by brazing or other similar fastening method, against a second shoulder 45 formed within the stepped channel for receiving the annular outer sealing plate ring 46 abutted therein. The outer sealing ring plate 46 could also be brazed directly to the outer peripheral surface 38 of the manifold ring, without the need for the second shoulder 45 in the stepped channel 36. The two sealing plates thereby divide the single stepped channel 36 into two discrete, nested fuel conduits that are sealed from one another and which can supply independent fuel supplies to the spray tip assemblies, primary nested fuel conduit 40 and secondary nested fuel conduit 42. This therefore permits the use of a single-piece fuel manifold, having at least two discrete fuel galleries formed therein in a simple and cost effective manner. This eliminates the need for employing fuel nozzle stems and conventional fuel nozzle injector arrays comprising hundreds of sub-components merely to connect an exteriorly located fuel manifold to the spray tip assemblies in the combustion chamber.

The primary and secondary annular nested fuel conduits 40 and 42 permit circumferential distribution of the primary and secondary fuel supply around the fuel manifold ring. At the location of each spray tip assembly 24 mounted to the annular manifold ring 22, fuel outlet passage holes are formed, by drilling or otherwise, in the manifold ring body substantially perpendicularly to the outer peripheral surface 38, to enable fluid flow communication between the nested fuel conduits and the spray tip assembly 24. Specifically, primary fuel conduit outlet passage 48 permits primary fuel flow from the primary fuel conduit 40 to be fed into the primary distributor 54 of the spray tip assembly, and secondary fuel conduit outlet passage 50 permits secondary fuel flow from the secondary fuel conduit 42 to be fed into the annular secondary fuel swirling cavity 63 of the spray tip assembly 24.

Such spray tip assemblies typically also comprise a valve member 52 disposed within the primary distributor 54 for regulating primary fuel flow through a primary cone 56, protected by a primary heat shield 58, before being ejected by a primary fuel nozzle tip 59. A secondary fuel swirler 60 disposed substantially concentrically about the primary distributor, comprises an annular secondary fuel swirling cavity, which swirls the secondary fuel flow before it is ejected through annular secondary fuel nozzle tip 61. An outer air swirler 62 comprises a plurality of circumferentially spaced air passages 64 which convey air flow for blending with the primary and secondary fuel sprays issuing from the primary and secondary spray orifices, 59 and 61 respectively, of the spray tip assembly.

Figure 4:
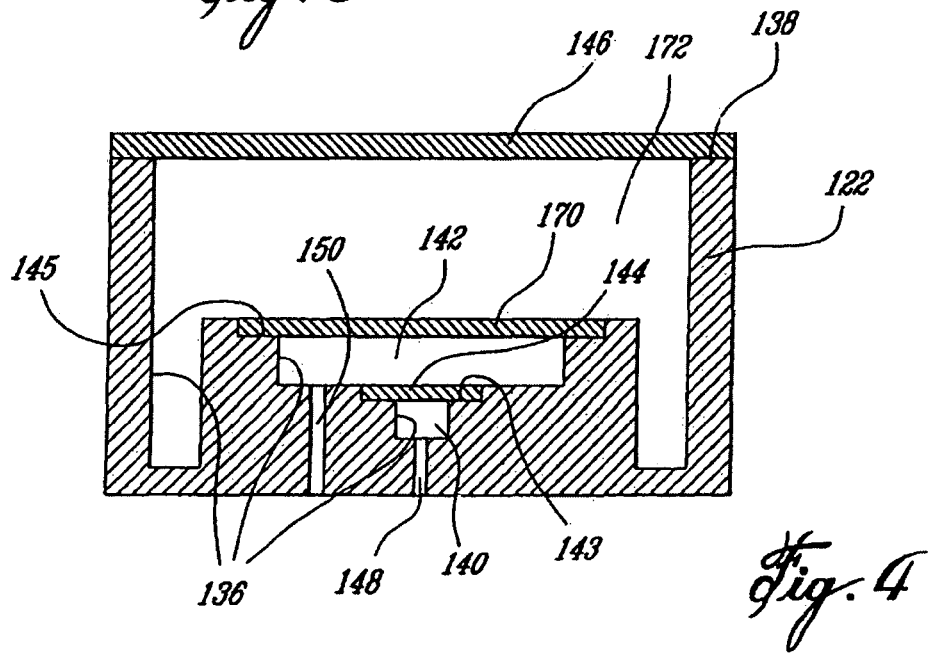
FIG. 4 is a cross-sectional view of an alternate fuel manifold ring having an additional nested channel.

Referring to FIG. 4, this embodiment of an annular fuel manifold ring 122 comprises an alternately-shaped stepped channel 136 machined in the solid, one-piece material of the manifold ring. The stepped channel 136 comprises an additional or auxiliary channel 172, therein. As above, a primary nested fuel conduit 140 is formed by fixing the first inner annular sealing member or plate 144 against a first shoulder 143, thereby dividing the primary fuel conduit 140 from the secondary nested fuel conduit 142. The secondary nested fuel conduit 142 is enclosed by a Second inner sealing member or plate 170 abutted with, and fixed against, second shoulder 145 within the stepped channel 136. As described above, although several attachment and sealing methods for fixing the sealing plates to the manifold ring can be used, they are preferably brazed thereto. The annular auxiliary channel 172 is further axially enclosed by an outer sealing member or plate 146, fixed against the outer peripheral surface 138 of the annular fuel manifold ring 122. As described, above, a primary conduit outlet passage 148 and a secondary conduit outlet passage 150, formed in the manifold ring perpendicularly to the outer peripheral surface 138 at predetermined circumferential locations of the manifold ring corresponding to location of the spray tip assemblies, provide dual independent fuel feeds to each spray tip assembly.

The auxiliary channel 172 can be used to carry a coolant, such as for example recirculated fuel, which will draw heat from the ring. The coolant flow in the auxiliary channel 172 is independent of the quantity of fuel being delivered to the engine. This is particularly needed during low power operation, when less fuel flows through the conduits of the manifold, and therefore more heat is absorbed from the combustion chamber by the entire manifold ring. This reduces fuel coking within the fuel manifold, which can occur if sufficient fuel flow is not maintained to cool the manifold ring. Each conduit, namely the primary fuel conduit 140, the secondary fuel conduit 142 and the auxiliary cooling conduit 172, each has its own inlet feed line, such that the fuel rates and the coolant flow rate can be independently controlled. Independent control of the primary and secondary fuel flows and independent feeding of each spray tip from the annular conduits providing circumferential fuel distribution, also permits fuel staging, wherein specific amounts of fuel are partitioned to specific circumferential locations of the combustion chamber to enhance ignition or to control emissions.

The present invention may also be used to provide multiple nested channels for providing discrete fuel conduits in a fuel nozzle stem.

Referring to FIG. 5 and FIG. 6, a fuel nozzle stem 200 comprises a central stem body 202 and a stem inlet end 204 and a stem outlet end 206. A stepped channel 236 is formed in a first outer surface 238 of the stem body 202. The channel is divided by an inner sealing member or plate 244, abutted with, and preferably brazed to, shoulder 243 within the stepped channel, thereby defining a primary nested fuel conduit 240 and a preferably larger secondary nested fuel conduit 242. Unlike, the nested fuel conduits described previously, the primary and secondary conduits 240 and 242 are substantially linear, rather than being annular. Therefore, the channel 236 has a length which is defined as the linear or longitudinal length of the channel. The secondary nested fuel conduit 242 is enclosed by an outer sealing member or plate 246, preferably fixed to the outer surface 238 of the stem body, again preferably by brazing. The primary and secondary fuel conduits thereby provide discrete fuel flow passages between the inlet end 204 and the outlet end 206 of the stem, which are adapted to be engaged with a fuel manifold adapter and a nozzle spray tip assembly, respectively. This permits at least two discrete fuel flows through the nozzle stem to a spray tip assembly. Typically, the entire fuel nozzle stem 200 is fitted within a surrounding cylindrical outer shield 278, which is can be brazed to the stem member to provide an element of heat protection. The stem body 202 can also comprise auxiliary cooling channels 272 formed therein according to the present invention. In the example shown, the auxiliary cooling channels 272 are on opposing sides of the stem body in outer lateral surfaces 280 of the stem body, substantially perpendicular to the first outer surface 238 with the stepped channel 236 formed therein. Auxiliary channel outer sealing plates 273 enclose the auxiliary cooling channels. The two opposing auxiliary coolant channels 272 are in fluid flow communication at the outlet end 206 of the stem, such that they can provide inlet and outlet passages for coolant flowing through to stem to provide cooling thereof.

While the above description constitutes the preferred embodiments, it will be appreciated that the present invention is susceptible to modification and change without departing from the fair meaning of the accompanying claims. For example, the present invention can offer reliability and weight benefits in any gas turbine engine application wherever multiple hydraulic or other fluid conduits are required or desired. Also, the stepped construction of the channel is preferred, but other configurations will be apparent to those skilled in the art. Still other modifications and applications beyond those described will be apparent to those skilled in the art.

The invention claimed is:

1. A fuel manifold for a gas turbine engine, the manifold comprising an annular body defining a first fuel conduit and at least a second fuel conduit therein, the first and second fuel conduits each having a fuel inlet defined in the body in communication with a fuel source and a fuel outlet defined in the body in communication with at least one fuel nozzle, a coolant conduit being defined within the body in heat transfer communication with both the first and second fuel conduits, the coolant conduit having at least one coolant inlet and at least one coolant outlet defined in the body, the first fuel conduit and the coolant conduit being fed independently from each other such as to respectively direct fluid flow therethrough independently of each other, and the second fuel conduit being fed independently from the first fuel conduit and the coolant conduit such as to direct fluid flow independently of the first fuel conduit and the coolant conduit.

2. The fuel manifold as defined in claim 1, Wherein the body includes a channel formed therein, the channel defining at least one shoulder along a length thereof corresponding to a change in width of the channel, at least a first inner sealing member being disposed within the channel and mounted to the shoulder substantially along the length of the channel, the fuel and coolant conduits being defined in nested relationship in the channel and sealingly separated from one another by the first inner sealing member, and an outer sealing member enclosing the channel substantially along its length to define an outer one of the fuel and coolant conduits.

3. The fuel manifold as defined in claim 2, wherein the first inner sealing member abuts the shoulder.

4. The fuel manifold as defined in claim 2, wherein the outer sealing member is engaged to an outer surface of the body.

5. The fuel manifold as defined in claim 2, wherein a second inner sealing member is disposed within the channel along the length thereof and separates the first fuel conduit from the second fuel conduit.

6. The fuel manifold as defined in claim 1, wherein the coolant conduit has a larger cross-sectional area than the first and second fuel conduits.

7. The fuel manifold as defined in claim 1, wherein the first and second fuel manifolds are provided in a single solid piece of material.

8. A fuel manifold for a gas turbine engine, the fuel manifold comprising:
   an annular body defining a first fuel conduit, at least a second fuel conduit, and at least one coolant conduit therein, the first fuel conduit circulating fuel from a fuel inlet to at least one fuel nozzle, the second fuel conduit circulating fuel from an additional fuel inlet to at least one additional fuel outlet, and the coolant conduit circulating coolant therein from a coolant inlet to a coolant outlet to absorb heat from the fuel manifold;
   means for controlling a flow of the fuel in the first fuel conduit and means for controlling a flow of the fuel in the second fuel conduit; and
   means for controlling a flow of the coolant the coolant conduit;
   wherein the fuel flow control means for the first and second fuel conduits and the coolant flow control means are independent from one another.

9. The fuel manifold as defined in claim 8, wherein the fuel flow control means for at least the first fuel conduit includes a first inlet feed line feeding the fuel inlet and the coolant flow control means includes a second inlet feed line feeding the coolant inlet.

10. The fuel manifold as defined in claim 8, wherein the body includes a channel formed therein, the channel defining at least one shoulder along a length thereof corresponding to a change in width of the channel. at least a first inner sealing member being disposed within the channel and mounted to the shoulder substantially along the length of the channel, the fuel and coolant conduits being defined in nested relationship in the channel and sealingly separated from one another by the first inner sealing member, and an outer sealing member enclosing the channel substantially along its length to define an outer one of the fuel and coolant conduits.

11. The fuel manifold as defined in claim 8, wherein the coolant conduit has a larger cross-sectional area than the fuel conduits.

12. The fuel manifold as defined in claim 8, wherein the fuel flow control means for the second fuel conduit includes a third inlet feed line feeding the additional fuel inlet, the third inlet feed line being independent from the first and second inlet feed lines.

13. The fuel manifold as defined in claim 8, wherein the body includes a channel formed therein, first and second inner sealing members being mounted within the channel along a length thereof in spaced apart relationship, the fuel, additional fuel and coolant conduits being defined in the channel and sealingly separated from one another by the first and second sealing members, and an outer sealing member enclosing the channel substantially along its length to define an outer one of the conduits.

14. The fuel manifold as defined in claim 8, wherein the first and second fuel manifolds are provided in a single solid piece of material.

15. A method of drawing heat from a manifold ring in a gas turbine engine, the method comprising:
   a. providing the manifold ring having a body with a first fuel conduit, a second fuel conduit, and at least one coolant conduit defined therein, each of the fuel conduits being in fluid communication with at least one fuel nozzle and having independent fuel inlets and fuel outlets defined in the body, and independently feeding fuel through the first and second fuel conduits;
   b. circulating a coolant through the cooling conduit from an inlet to an outlet thereof to absorb heat from the manifold ring; and
   c. controlling a flow of the coolant within the cooling conduit independently of the fuel flow to the fuel nozzles through the first and second fuel conduits.

16. The method as defined in claim 15, wherein controlling the flow of the coolant includes feeding the coolant through the inlet independently from the fuel feed to the first and second fuel conduits.

17. The method as defined in claim 15, wherein circulating the coolant through the cooling conduit includes circulating fuel through the cooling conduit.

* * * * *